United States Patent [19]

Jones

[11] Patent Number: 5,368,009
[45] Date of Patent: Nov. 29, 1994

[54] TURBO BROILER

[76] Inventor: Richard R. Jones, 4095 Tarragona Dr., St. Louis, Mo. 63129

[21] Appl. No.: 989,528

[22] Filed: Dec. 11, 1992

[51] Int. Cl.$^5$ .................... A47J 37/00; F24C 3/00
[52] U.S. Cl. ............................ 126/41 R; 126/39 K; 99/447
[58] Field of Search ............... 126/41 R, 39 R, 39 K, 126/38, 50; 99/445-447, 444, 340

[56] References Cited

U.S. PATENT DOCUMENTS

| | | | |
|---|---|---|---|
| 1,133,850 | 3/1915 | Garraux | 126/41 R |
| 1,504,102 | 8/1924 | Davis | 99/445 |
| 1,963,817 | 6/1934 | Wiederhold | 126/41 R |
| 2,905,077 | 9/1959 | Del Francia | 99/446 |
| 3,463,139 | 8/1969 | Hayashi et al. | 99/446 |
| 4,683,867 | 8/1987 | Beatty | 126/41 R |
| 4,727,853 | 3/1988 | Stephen et al. | 126/41 R |
| 4,819,614 | 4/1989 | Hitch | 126/41 R |
| 5,076,154 | 12/1991 | Bagwell | 99/444 |
| 5,117,747 | 6/1992 | Kuechler | 126/41 R |

FOREIGN PATENT DOCUMENTS 240951 7/1959 Australia .................. 126/41 R

*Primary Examiner*—James C. Yeung
*Attorney, Agent, or Firm*—G. Donald Weber, Jr.

[57] ABSTRACT

A gas-fired broiler which produces infrared heat by means of stainless steel radiants. Stainless steel baffles are located adjacent to and between each pair of radiants which causes the flue air and spent gases to be redirected over the hot radiants, thus superheating the air. The superheated air and the heat from the radiants further heat the baffles. By incorporating the baffles between each pair of radiants to block the direct venting of the air, greater efficiency is achieved. The improved efficiency of the broiler is provided by producing higher cooking temperatures while using the same amount of BTU's.

14 Claims, 1 Drawing Sheet

TURBO BROILER

BACKGROUND

1. Field of the Invention.

This invention is directed to gas-fired broilers, in general, and to a commercial-grade, gas-fired broiler which has improved operating characteristics, in particular.

2. Prior Art.

There are many broilers available on the market for cooking of food. There are charcoal broilers, gas-fired broilers, electric broilers and the like. In addition, there are commercial broilers which are used in restaurants and the like and non-commercial broilers which are used for patios, backyards and the like.

In many cases, the commercial broilers are used to cook food in fast food restaurant environments and the like (although not limited thereto). Commercial gas-fired broilers known in the art are, generally, conventional in design. In the conventional design, gas-fired broilers include typical burners which are supplied with gas and provide the heating of these broilers.

In many instances, the broilers include radiants which are, in effect, heating elements which supply the radiant heat to the food being cooked after the radiants have been heated by the burner elements. In this device, air is free-vented between the burners and the radiants. This type of inefficient broiler is well-known in the art.

However, it is always desirable to obtain or produce broilers which are more efficient and can produce greater heat utilization with the same number of BTU's.

PRIOR ART STATEMENT

A patent search has not been conducted with regard to this application and/or this invention.

SUMMARY OF THE INSTANT INVENTION

A gas flame produced at a burner element heats the stainless steel radiant to a cherry red glow. The radiant emits infrared rays which are transmitted in straight lines to cook the product and heat the grates which can be cast iron, steel rods, or the like.

A stainless steel baffle bridges the space between adjacent radiants in order to direct flue air over the hot radiants, effectively superheating the air. This superheated air combines with the infrared rays from the radiants to further heat the baffles causing them to produce additional radiant heat.

Tests have shown that the broiler of the instant invention produces up to 150° F. more heat through the application of this design principal with no increase in BTU's.

DESCRIPTION OF A PREFERRED EMBODIMENT

Figure 1:
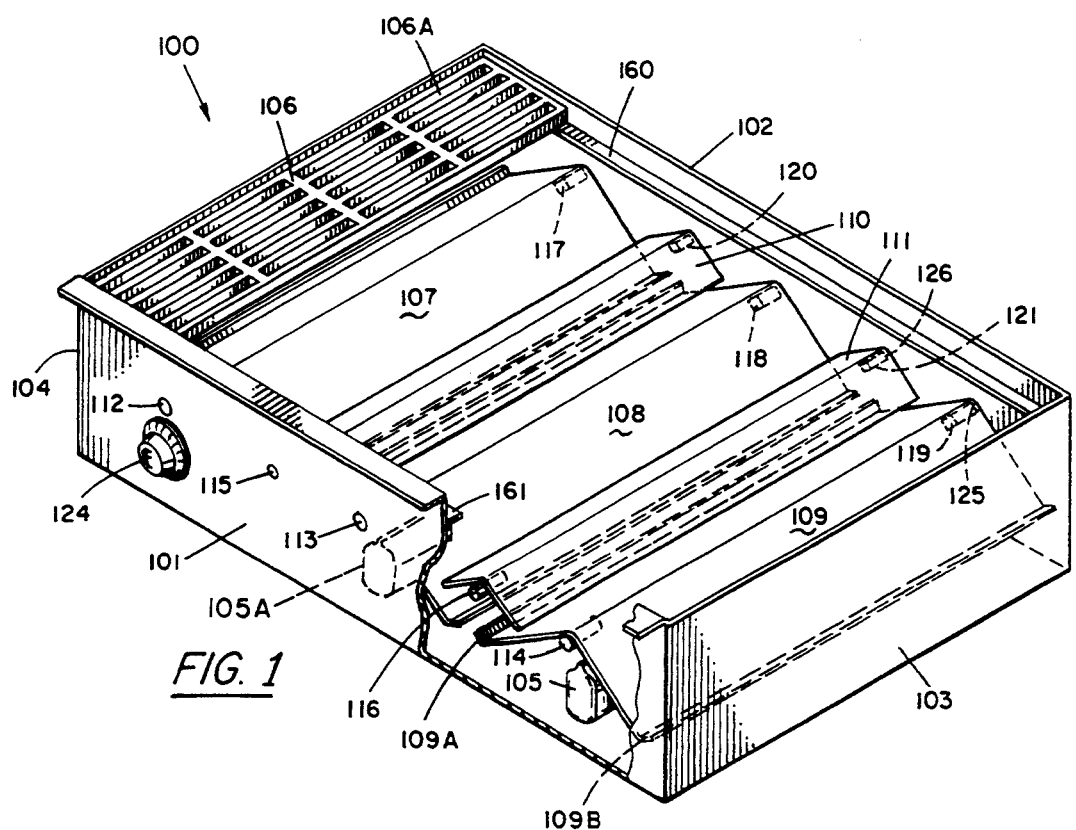
FIG. 1 is a partially broken-away, isometric view of the broiler of the instant invention.

Referring now to FIG. 1, there is shown a representative illustration of the invention described herein. The invention incorporates a gas-fired, commercial-type broiler with a broiler chamber 100. In this illustration, the broiler chamber 100 is shown to be generally rectilinear in configuration. Many conventional features which are well-known in broilers are omitted for purposes of clarity and brevity.

As noted, the broiler chamber 100 is generally rectilinear in configuration. This is not absolutely essential, but represents a preferred embodiment.

The broiler chamber 100 includes the sides 101, 102, 103 and 104. The broiler chamber 100 is, typically, fabricated of stainless steel or other suitable materials and may include an insulator liner, splash guards, heat shields and the like which are not shown but which are conventional in broilers.

Mounted within the broiler chamber 100 is at least one burner unit 105 which is shown illustratively for convenience. Of course, a plurality of such burners can be mounted in the broiler 100 as suggested by burner 105A, shown in dashed outline. The mechanics and specifics of the mounting of the burner 105 are conventional and are not shown with great detail herein. Suffice it to say that the burners 105 are connected to a suitable fuel supply which provides the fuel such as butane, natural gas or the like.

The burner 105 is controlled by a knob similar to knob 124 which is used to control an appropriate fuel valve. The valve, not shown, is connected in line between the fuel source (not shown) and the burner 105 in a conventional manner.

In addition, a conventional grate 106 (or alternatively, a grill) is mounted in the broiler chamber 100 on grate supports 160 and 161 in a conventional manner. Again, the grate 106 (or grill) can comprise a single unit or a plurality of units which are mounted to the broiler. Typically, but not limitatively, there is a grate portion associated with and mounted above each burner 105.

Also, an inverted V-shaped radiant 109 is mounted above burner 105. Similarly, radiants 107 and 108 are mounted above and adjacent to other burners (not shown) which are similar to burner 105. The radiants 107, 108 and 109 are fabricated of stainless steel or the like. The radiants are mounted within the burner cabinet 100 so that they are adjacent to (but spaced apart from) a burner 105 (or the counterpart thereof). In addition, the radiants are spaced apart from each other. Lips 109A and 109B are formed at the end of the V-shaped radiant. These lips or ledges are provided to add structural strength to the radiant to prevent warping, bending or the like.

In this embodiment, a round pin 114 is welded to the inner surface of the front side 101 of the broiler chamber 100. The round pin 114 is utilized to support radiant 109. In particular, the apex of the inverted V-shaped radiant rests upon the pin 114. As noted, the pin 114 is integrally formed or welded to the inner surface of the front side 101 of the broiler chamber. The radiant 109 rests freely on the pin 114 and is permitted to rotate slightly in order to accommodate a preferred orientation.

At the other end of the radiant 109 is a square or rectilinear pin 119. Pin 119 is formed integrally with or welded to the apex of the inverted V-shaped radiant 109. A hole or aperture 125 is formed in the rear face 102 of the broiler chamber 100. The pin 119 is inserted into and through the aperture 125. Because the aperture 125 and the pin 119 are of the same general shape and size, the pin 119 fits fairly snugly therein and prevents the radiant 109 from moving or rotating significantly while in use.

By this arrangement of pins 114 and 119 at the respective ends of the radiant, the radiant 109 is readily and easily removed for cleaning or the like. Likewise, reinsertion into the broiler chamber 100 after these activities is easily accomplished.

Similarly, round pins 112 and 113 (and others if desired) are provided at the inner surface of the front side 101 of the broiler chamber. In like fashion, the rectilinear pins 117 and 118 (and others if desired) are formed with or connected to the radiants 107 and 108, respectively, in like fashion. Thus, the radiants 107 and 108 can be mounted in the same fashion as radiant 109.

In the embodiment shown in FIG. 1, baffles 110 and 111 are provided. These baffles are mounted adjacent to and above the edges of adjacent radiants. For example, baffle 110 is mounted over the edges of radiants 117 and 118, as well as the space therebetween. Likewise, baffle 111 is mounted over the edges of radiants 108 and 109, as well as the space defined therebetween.

Similarly to the radiants, pins 115 and 116 are mounted to the inner surface of front face 101 of the broiler chamber 100.

In like fashion, rectilinear pins 120 and 121 are joined to the apex of the respective vertices of baffles 110 and 111. The rectilinear pins 120 and 121 are passed through apertures 126 (and the like) in the rear face of the broiler chamber 100.

The baffles, like the radiants, are preferably fabricated of stainless steel and are easily removed and/or replaced in the broiler chamber.

In a preferred embodiment, the rectilinear pins 120 and 121 are of the same size so that the baffles are interchangeable. Likewise, the rectilinear pins 117, 118 and 119 are of the same size so that the radiants are interchangeable. However, the pins on the baffles and the pins on the radiants are of different sizes in order to prevent the baffles and the radiants from being inadvertently interchanged during a cleaning and/or reassembling procedure.

Figure 2:
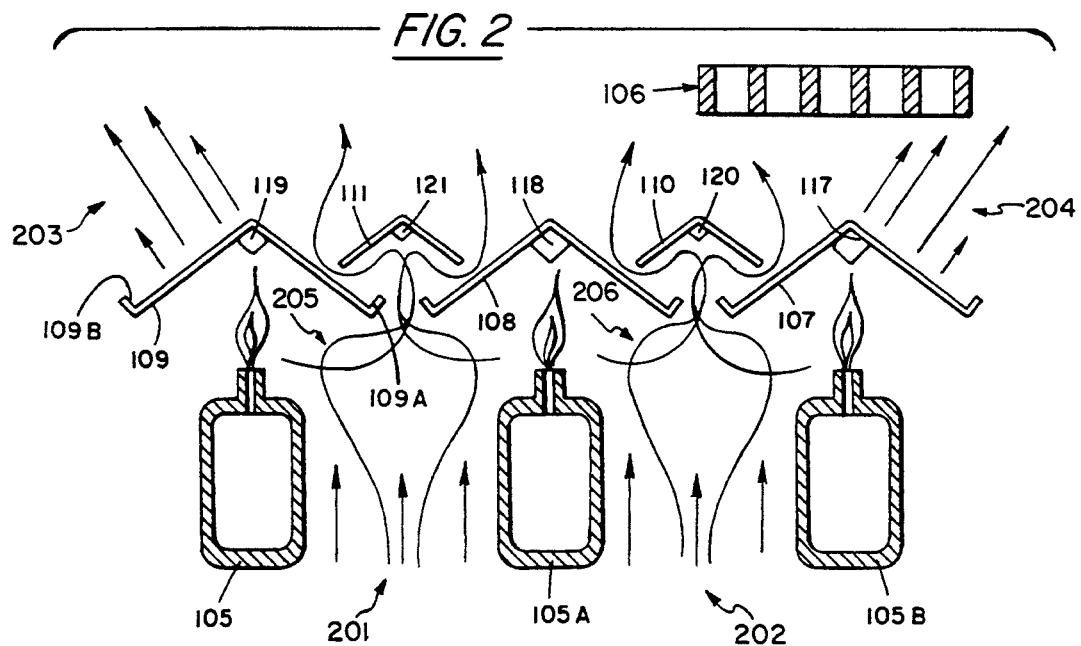
FIG. 2 is a schematic representation of a cross-sectional view of a significant portion of the broiler shown in FIG. 1

Referring now to FIG. 2, there is shown a representational and slightly enlarged illustration of the assembly shown in FIG. 1. Thus, a plurality of burners (including burners 105, 105A and 105B, all of which are substantially identical) are shown in the general position in a broiler of the instant invention. A representative grate section 106 is shown disposed above one of the burners in this case burner 105B. Other grate sections have been omitted for clarity. Of course, the grate can be a single section which can cover all of the burners, as shown in FIG. 2. The relationship of the radiants 107, 108 and 109 relative to burners 105B, 105A and 105, respectively, is depicted. Each of these radiants includes the respective rectilinear pin 117, 118 and 119.

Immediately above the adjacent edges of any pair of radiants is the appropriate baffle. For example, the baffle 110 is disposed above the edges of radiants 107 and 108. The baffle is mounted on rectilinear pin 120 and spaced above the opening between the pair of radiants and away from the respective edges of the radiants. However, the spacing of the baffle is relatively close to the legs of the respective radiants in order to create a preferred airflow.

As shown in FIG. 2, the radiants are heated to a cherry red glow whereupon the respective legs of the radiants tend to radiate heat outwardly therefrom in straight lines at a nearly 90° angle (at least within the dimensions of the broiler and broiler cabinet). These heat radiation lines are suggested by arrows 203 and 204. Obviously, if the baffles 110 and 111 were removed, similar substantially parallel heat radiation lines would be provided at each of the legs of all of the radiants.

However, by providing the baffles 110 and 111 in the locations shown, the flue air represented by the arrows 201 and 202 passes through the bottom of the broiler chamber 100 and between the burners 105, 105A and 105B (or any combination thereof) and is heated by the flame shown adjacent to each burner. The flue air also tends to be heated by the respective radiants.

In addition, as shown, baffles 110 and 111 cause the heated air (which tends to rise between the radiants) to be turned back and reversed upon itself whereby it comes into contact with (or in close proximity to) the respective radiants. Thus, the hot air becomes superheated and then passes upwardly to and through grate 106. That is, hot air and flue gases combine and exit between the radiants. This mixture encounters the baffle and is redirected to the hot radiant where the air is accelerated by the venturi effect and superheated by the hot radiants. This hot air also heats the baffle which then becomes a secondary radiant wherein the superheated air convects upward to aid in the cooking of the product being broiled. Thus, the super-heated convective air is applied to the grates, which in a preferred embodiment are made of cast iron, to produce additional radiant heat. As well, the superheated air provides heat to the grates and the product being cooked. Thus, a more efficient cooking and heating process occurs.

It has been demonstrated that the device of the instant invention can produce up to 150° F. more heat that the conventional devices without the baffles. Moreover, and perhaps more importantly, this additional heat is achieved with no increase in BTU's or fuel requirements for the system.

Thus, there is shown and described a unique design and concept of a gas-fired broiler which produces infrared heat by means of radiants and baffles. The particular configuration shown and described herein relates to a gas-fired broiler which has improved operating characteristics and is directed to commercial use. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. A broiler apparatus comprising,
    a plurality of heating elements;
    a plurality of heat radiants;
    each of said heat radiants has a generally inverted V-shape,
    said heat radiants mounted in spaced apart relationship above said heating elements,
    a plurality of baffles;
    each of said baffles has a generally inverted V-shape,
    said baffles mounted in spaced apart relationship above said heat radiants, vertically aligned with the spaces between adjacent pairs of said heat radiants and in overlapping relationship with a portion of each of said heat radiants in said adjacent pairs of heat radiants, whereby said baffles redirect heated flue air passing from said heating elements through said spaces onto said heat radiants thereby to produce superheated air and to increase the heat at said heat radiants; and a housing surrounding and supporting said heating elements, said heat radiants and said baffles.

2. The broiler recited in claim 1 wherein,
said heating elements are operative to burn a gas fuel.

3. The broiler recited in claim 1 wherein,
said heat radiants are fabricated of a ferrous metal.

4. The broiler recited in claim 3 wherein,
said ferrous metal is stainless steel.

5. The broiler recited in claim 4 wherein,
said stainless steel baffles are located adjacent to and between each pair of radiants wherein the flue air and spent gases are redirected over the hot radiants thereby superheating the air passing over the radiants, said superheated air and the heat from the radiants apply further heat to said baffles which effectively become secondary radiants between each pair of radiants to block the direct venting of the air whereby greater efficiency is achieved.

6. The broiler recited in claim 1 wherein,
said baffles are fabricated of a ferrous metal.

7. The broiler recited in claim 1 including,
grate means supported in said housing above said heat radiants and said baffle.

8. The broiler recited in claim 1 including,
a plurality of round pegs extending inwardly of said housing for supporting one end of each of said plurality of heat radiants and said plurality of baffles.

9. The broiler recited in claim 1 wherein,
each of said heat radiants and each of said baffles includes a pin projecting from one end thereof for mounting said heat radiants and said baffles to said housing.

10. The broiler recited in claim 9 including,
a plurality of apertures in said housing for receiving said pins at said heat radiants and said baffles thereby to support said heat radiants and said baffles.

11. The broiler recited in claim 10 wherein,
said pins and said apertures are shaped for spatial engagement.

12. The broiler recited in claim 1 wherein,
all of said heat radiants and all of said baffles are aligned horizontally with a portion of each baffle aligned vertically above portions of two adjacent heat radiants.

13. The broiler recited in claim 1 wherein,
each of said heating elements produces heat which is applied to the undersurface of said heat radiants which radiate heat therefrom, said baffle redirect heat from said heating elements onto the upper surface of said heat radiants whereby said heat radiants are superheated without any increase in heat production by said heating elements.

14. The broiler recited in claim 1 wherein,
said heat radiants include lips at the edges thereof.

* * * * *